Figure 1:
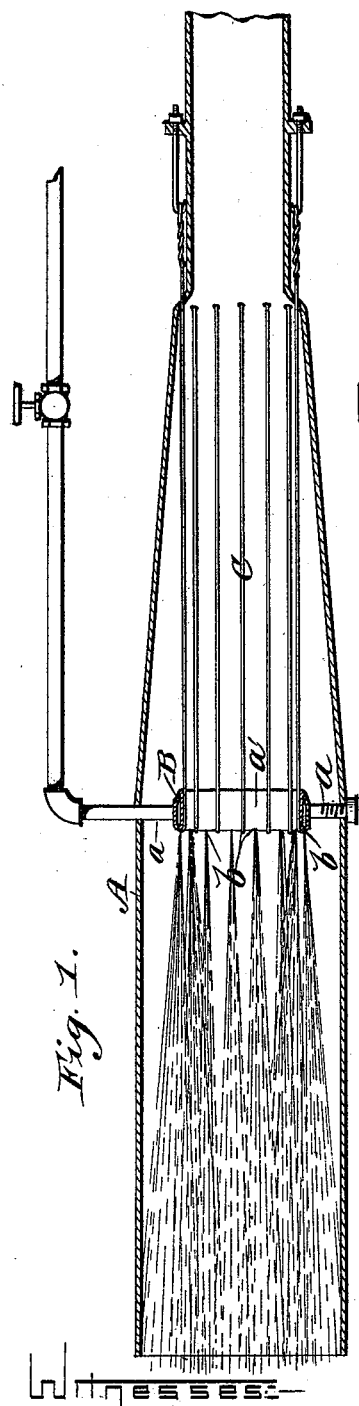

(No Model.) 2 Sheets—Sheet 1.

W. McCLAVE.
STEAM JET CONVEYER FOR ASHES OR OTHER LIGHT SUBSTANCES.

No. 490,583. Patented Jan. 24, 1893.

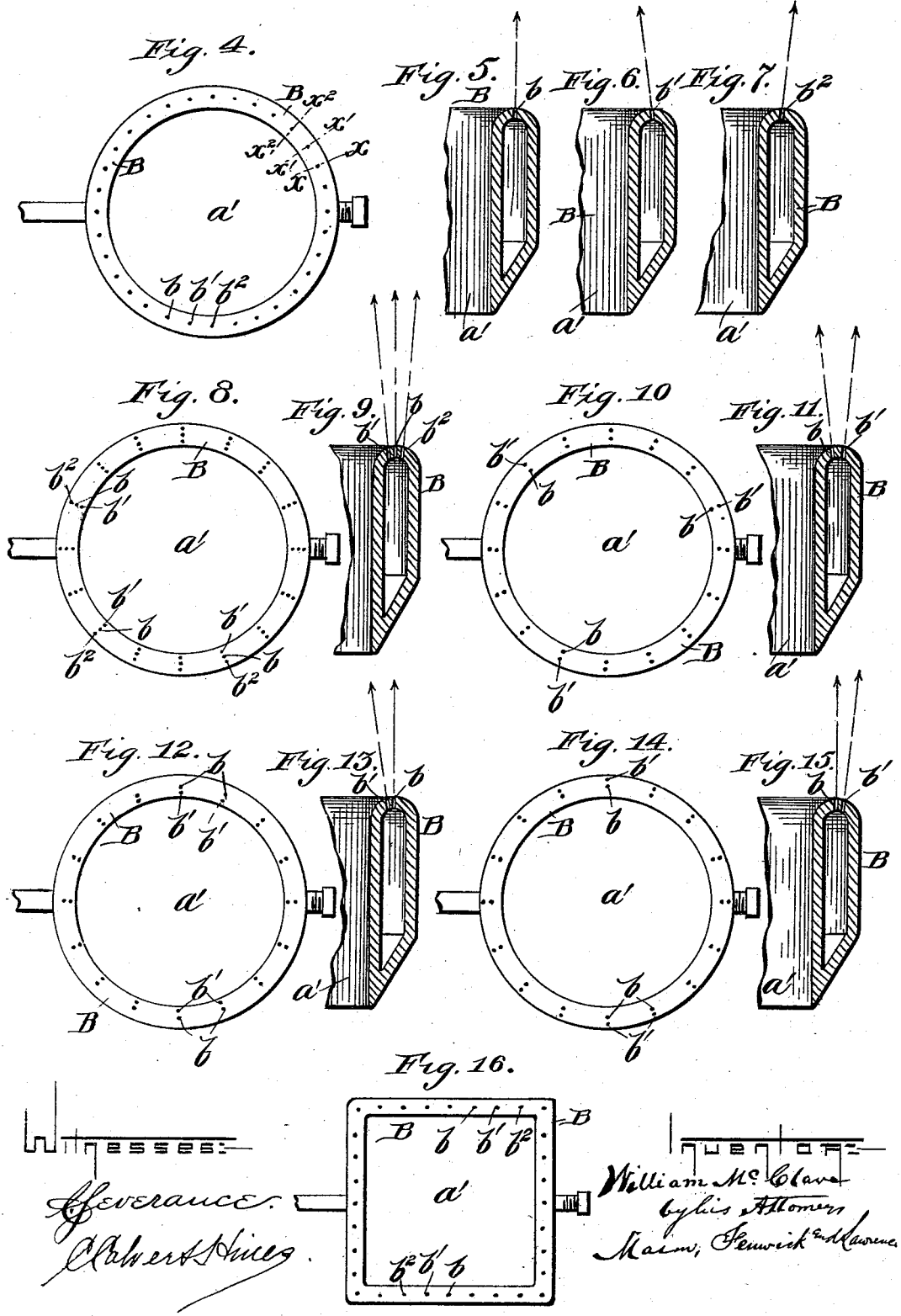

UNITED STATES PATENT OFFICE.

WILLIAM McCLAVE, OF SCRANTON, PENNSYLVANIA.

STEAM-JET CONVEYER FOR ASHES OR OTHER LIGHT SUBSTANCES.

SPECIFICATION forming part of Letters Patent No. 490,583, dated January 24, 1893.

Application filed November 12, 1892. Serial No. 451,817. (No model.)

*To all whom it may concern:*

Be it known that I, WILLIAM MCCLAVE, a citizen of the United States, residing at Scranton, in the county of Lackawanna and State of Pennsylvania, have invented certain new and useful Improvements in Steam-Jet Conveyers for Ashes and other Light Substances; and I do hereby declare the following to be a full, clear, and exact description of the invention, such as will enable others skilled in the art to which it appertains to make and use the same.

My invention relates to steam suction conveyers for removing ashes and clinkers from ash pits, and also for moving coal-dust, culm and the like from one place to another; and its object is to provide for insuring an open, or substantially unobstructed passage through a steam jetting device of ring or other analogous form, and at the same time secure an effective displacement of air at both the center and inner surface of the conveyer tube, and thereby cause a powerful suction of air for performing the conveying operation.

My invention consists in the combination with a conveying tube, of a steam jetting device of ring or other analogous geometrical outline—internally and externally, having its jetting orifices or nozzles so arranged that one portion of a series of orifices shall so eject the steam that the jets shall have a convergence toward the center of the tube, and the other portion of the series of orifices shall eject the steam either parallel with the inner longitudinal surface of said tube, or with a divergence from the center of the tube; or parallel with said surface, and outwardly divergent from the center of the tube.

The invention also consists in a novel combination of conveyer tube, two or more ring, or analogously shaped jetting devices, each having a plurality of steam jet discharging orifices or nozzles, and the inner one of the jetting rings having a large open, or substantially unobstructed central passage through it for the air and large pieces of the substances being conveyed, to pass through it, and the outer jetting ring or rings also having a passage or passages through them for the powdered portion of the substances to pass through, the said steam jetting orifices of each steam jetting device being arranged to eject the steam in the novel manner above mentioned, and as will be hereinafter described.

The invention also consists in a novel combination of a conveyer tube, a ring or other analogously shaped steam jetting device, as hereinafter described, and a guiding and guarding open-work tube of less diameter than the outer conveying tube, for directing the solid particles of the substances through the central passage of the steam jetting device, and at the same time allowing the pulverized substances to pass off outside the steam jetting device, between it and the inner surface of the tube.

Figure 2:
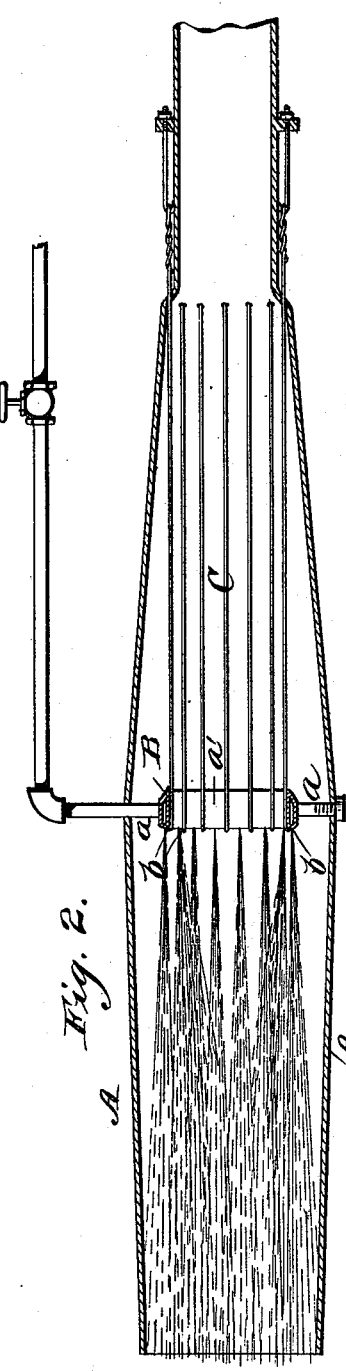
Figure 3:
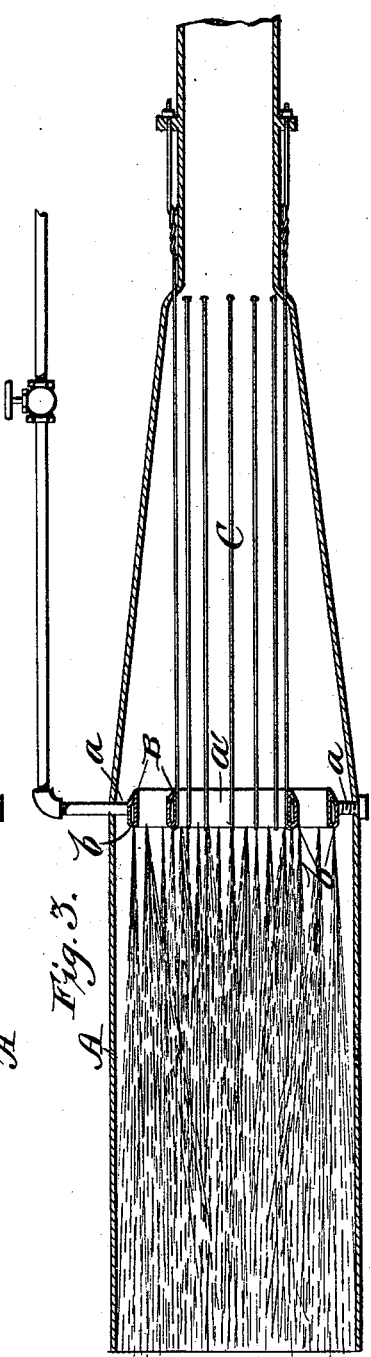

In the accompanying drawings, Figure 1 is a longitudinal section of a portion of a conveyer tube, a single steam jetting ring, its connecting steam pipe, and a guiding and guarding open-work tube. Fig. 2 is a similar view to Fig. 1, showing a slightly different shaped conveyer tube, and steam jetting device with jet orifices or nozzles constructed to eject the steam in a slightly different manner. Fig. 3 is a similar section to Figs. 1 and 2, but showing two steam jetting rings. Fig. 4 is a front view of a steam jetting ring having its jet orifices set in series of triplets, and in a single circle, so as to eject the steam in a peculiar manner with respect to the center and inner surfaces of the conveyer tube. Figs. 5, 6 and 7 are sections in the lines $x$—$x$, $x'$—$x'$, $x^2$—$x^2$, of Fig. 4, illustrating the set or location of the orifices relatively to one another. Fig. 8 is a front view of another construction of steam jetting device, and Fig. 9 is a broken section of the same. Fig. 10 is a front view of a steam jetting ring having its orifices arranged in two circles, and Fig. 11 is a section of the ring shown in Fig. 10, illustrating the set or location of the orifices relatively to one another. Fig. 12 is a front view and Fig. 13 a section of a ring, illustrating another construction of the orifices. Fig. 14 is a front view and Fig. 15 a section of a ring, illustrating another construction of the steam orifices. Fig. 16 is a diagram, showing the jetting device made in form of a rectangular frame.

A in the drawings represents the conveyer tube, which may be in longitudinal section in either of the forms shown in Figs. 1, 2 and 3.

B is a steam jetting device which may be either circular or rectangular, as shown in Figs. 4, 8, 10, 12, 14 and 16. This ring is of considerable less diameter than the conveyer tube, and is supported centrally and concentrically in the tube, so that a large passage a exists between its periphery and the tube A, and also a substantially unobstructed large central passage a' is afforded through it. The finer substances such as ashes are passed off through the passage a, and the larger substances, such as clinkers, through the central passage a'.

The novelty of the conveyer, comprising a tube and jetting ring, lies in the construction and arrangement within the tube of a jetting device or devices having the steam jet orifices or nozzles b and b', or b' and b², arranged relatively to one another, as described.

For guiding and guarding the larger pieces through the jetting device, an open-work tube C is arranged centrally in the conveyer tube, and the respective wires of which it is formed are connected to it and the ring, by means such as are shown, which means are not claimed here, and they may be as substantially described and claimed in my application filed October 15, 1892, Serial No. 448,999.

By referring to Figs. 4, 5, 6 and 7, it will be seen that the steam jets will be ejected in three planes, viz: a plane parallel with the wall of the tube A, Fig. 1; divergent from the center of the tube and toward the inner surface thereof, and convergent toward the center of the tube. The illustration of the flow of the jets of steam in Fig. 1 makes it plain that the whole area of the tube is supplied with jets of steam at a proper distance forward of the ring, and thus a powerful forcing and suction action is insured. With the plan Figs. 2, 8 and 9, the same effect as is produced by plan, Figs. 4, 5, 6 and 7, as is evident from the illustration in Fig. 2, is secured. With plan, Figs. 10 and 11, part of the steam jets are ejected parallel with the surface of the tube, and a part divergent therefrom toward the center of the tube. This plan supplies the central space and the space near the surface of the tube with jets of steam, and the desired effect is produced. With plan, Figs. 14 and 15, the steam is ejected parallel with the center of the tube and divergent from said center. In Fig. 16, the same arrangement of the jet orifices as in Figs. 1, 5, 6 and 7 is adopted, but the jetting device is made square. It may be of any other suitable geometrical form.

In Fig. 3, two jetting rings B are applied within the tube A, and in each ring the orifices may be arranged in any of the novel ways shown in the other figures. This construction gives a very powerful suction, and is adapted for large conveyer tubes, and, when used, the ashes pass between the rings and also between a ring and the tube, while the clinkers pass through the innermost or central ring. There may be more rings than two; and, also, more than three circles or lines of jetting passages may be provided.

I would state that the improved arrangement of steam jet orifices herein described may be usefully employed in the rings used in my tandem conveyer, the number and date of filing of which were hereinbefore mentioned.

It is a very important matter to have the central portion of the tube sufficiently supplied with the jets of steam, and to this end I took out Letters Patent dated May 19, 1885, No. 318,008; and were it not necessary to keep the central opening of the ring unobstructed, my said patent would answer perfectly; but the smaller inner ring of said patent cannot be as beneficially used for the purpose herein mentioned, as it would somewhat interfere with the conveyance of clinkers and the like through the center of the steam jetting devices used in my present invention.

I am aware that outside a tube, and used separate therefrom, jetting devices having divergent spraying orifices are old, but it is the steam jetting device of this type, inclosed in a conveyer tube, that makes up the novelty and utility of my construction and combination.

The novel combination of inclosing tube, and peculiar steam jetting devices herein described, might be advantageously adopted for supplying air to boiler furnaces; and the peculiar jetting devices in a tube can be applied at the ends of boiler tubes for the purpose of sucking and conveying soot and ashes out of said tubes.

In my application Serial No. 448,999, filed October 15, 1892, I have shown and claimed the guarding and guiding wires, a steam jetting device and a conveyer tube, and therefore this construction is not herein claimed broadly, neither are the guiding wires herein claimed specifically.

What I claim as my invention is:—

1. The combination with a conveyer tube, of a steam jetting device of ring or analogous form having a plurality of steam jet discharging orifices or nozzles near its outer edge, and a large open or substantially unobstructed central passage through it for the air and unpulverized substances conveyed, to pass through; the said steam jet orifices of said jetting device being constructed and arranged to eject from the same jetting device the steam, with one portion of the orifices or nozzles, with a convergence toward the center of the tube, and with the other portion of jets or nozzles, at the same time, eject the steam either parallel with the inner longitudinal surface of said tube or divergent outwardly from the center of the tube, or parallel with said surface and outwardly divergent from said center of the tube, substantially as described.

2. The combination with a conveyer tube, of two or more steam jetting devices, each having a plurality of steam jet discharging orifices or nozzles, and the inner one having a large open or substantially unobstructed central passage through it for the air and the large pieces of substances being conveyed, to pass through it, and the outer jetting device or devices also having a passage or passages through them for the powdered portion of the substances to pass through, the said steam jet orifices of each jetting device being arranged to eject the steam from a portion of the orifices, with a convergence toward the central longitudinal axis of the tube, and the other portion of the jets, at the same time, eject the steam either parallel with the inner surface of said tube, or parallel with said surface and outwardly divergent from said center, substantially as described.

3. The combination with a conveyer tube, of a steam jetting device having a plurality of steam jet discharging orifices or nozzles near its outer edge, and a large open or unobstructed central passage through it for the air and unpulverized as well as the pulverized substances, to pass through it, a portion of said jetting orifices or nozzles jetting steam substantially parallel with the axis of the tube, and the other portion jetting steam with a convergence toward the center of the tube; and a guiding and guarding open-work tube for directing the solid particles of the substances through the central passage of the steam jetting device, and, at the same time, allowing the pulverized substances to pass off outside the steam jetting device, between it and the inner surface of the tube, substantially as described.

In testimony whereof I hereunto affix my signature in presence of two witnesses.

WILLIAM McCLAVE.

Witnesses:
E. T. FENWICK,
C. CALVERT HINES.